United States Patent [19]

Kuwakado et al.

[11] Patent Number: 4,556,177
[45] Date of Patent: Dec. 3, 1985

[54] LOCK-TYPE SEAT BELT RETRACTOR OF AUTOMOBILE

[75] Inventors: Satosi Kuwakado, Aichi; Toshiaki Shimogawa; Teruhiko Koide, both of Okazaki; Shigeyasu Kanada, Inuyama; Masahiro Iwatsuki, Kariya, all of Japan

[73] Assignees: Nippon Soken, Inc., Nishio; Kabushiki Kaisha Tokai Riki Denki Seisakusho, Niwa, both of Japan

[21] Appl. No.: 533,811

[22] Filed: Sep. 19, 1983

[30] Foreign Application Priority Data

Sep. 24, 1982 [JP] Japan .................................. 57-165116

[51] Int. Cl.⁴ ...................... A62B 35/02; B65H 75/48
[52] U.S. Cl. ............................................. 242/107.4 A
[58] Field of Search ................ 242/107.4 A; 280/806; 297/478, 480

[56] References Cited

U.S. PATENT DOCUMENTS

| | | | |
|---|---|---|---|
| 3,868,068 | 2/1975 | Heath | 242/107.4 A |
| 3,923,269 | 12/1975 | Kell | 242/107.4 A |
| 3,995,788 | 12/1976 | Stephenson | 242/107.4 A |
| 4,069,988 | 1/1978 | Pouget | 242/107.4 A |
| 4,077,584 | 3/1978 | Lafont | 242/107.4 A |
| 4,164,335 | 8/1979 | Kondziola | 242/107.4 A |
| 4,181,326 | 1/1980 | Hollowell et al. | 242/107.4 A X |
| 4,331,304 | 5/1982 | Matsuoka et al. | 242/107.4 A |

Primary Examiner—John M. Jillions
Attorney, Agent, or Firm—Cushman, Darby & Cushman

[57] ABSTRACT

A lock-type seat belt retractor including a ratchet mechanism, an inertia member which senses shock to the automobile, and a transmitting mechanism which transmits a movement of the inertia member to a pawl of the ratchet mechanism. The inertia member senses the shock by its relative motion to the transmitting mechanism. The transmitting mechanism includes a rod which moves in response to movement of the inertia member and pushes up a lever to raise the pawl. When the pawl engages with a tooth of a ratchet wheel, the seat belt is locked. The transmitting mechanism further includes a member which supports the rod and the inertia member. The support member swings relative to the automobile body so that this retractor can be locked reliably regardless of its angular position.

14 Claims, 23 Drawing Figures

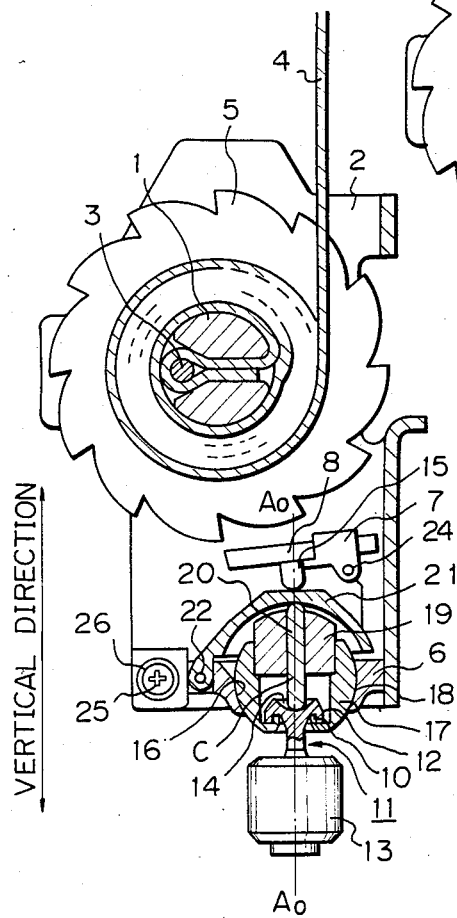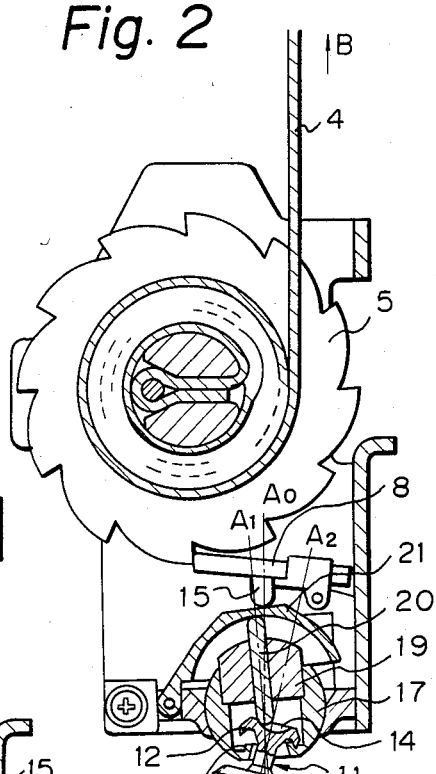

Fig. 3
Fig. 4
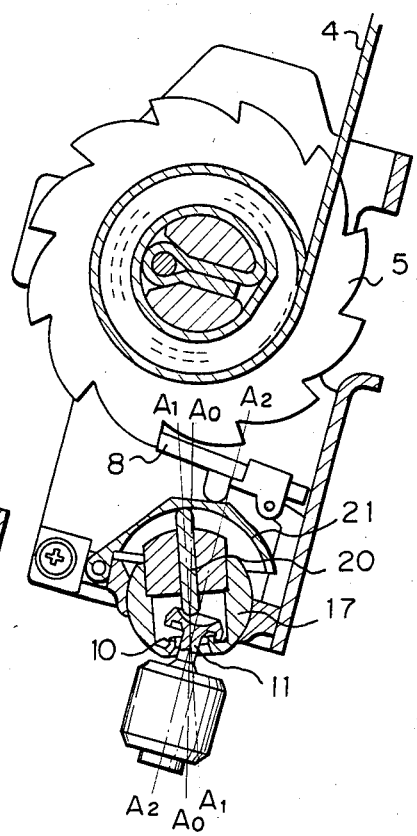
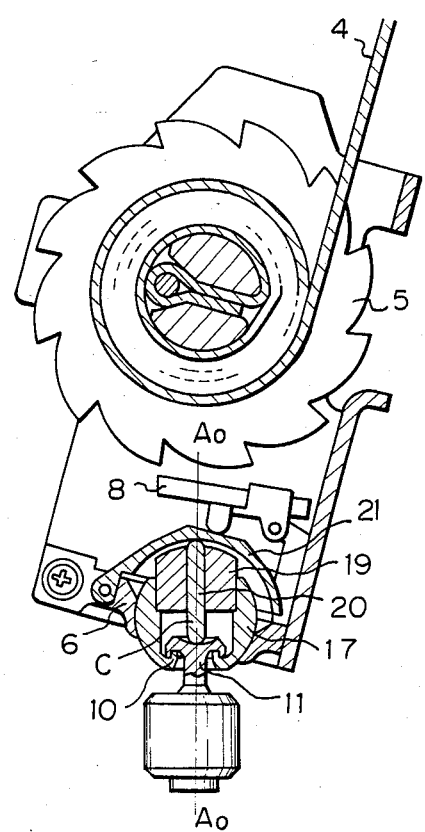

Fig. 6
Fig. 5
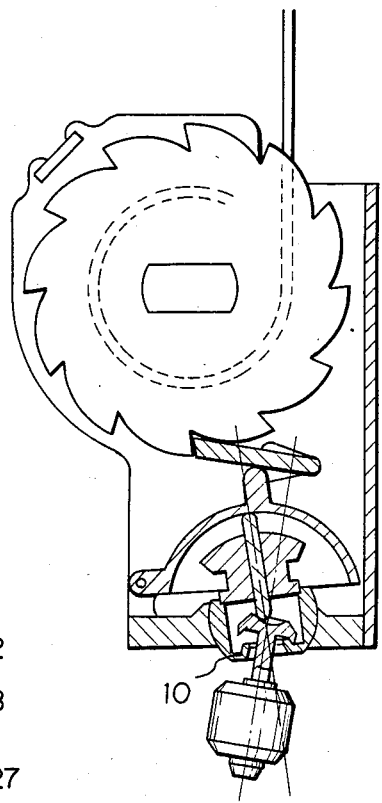
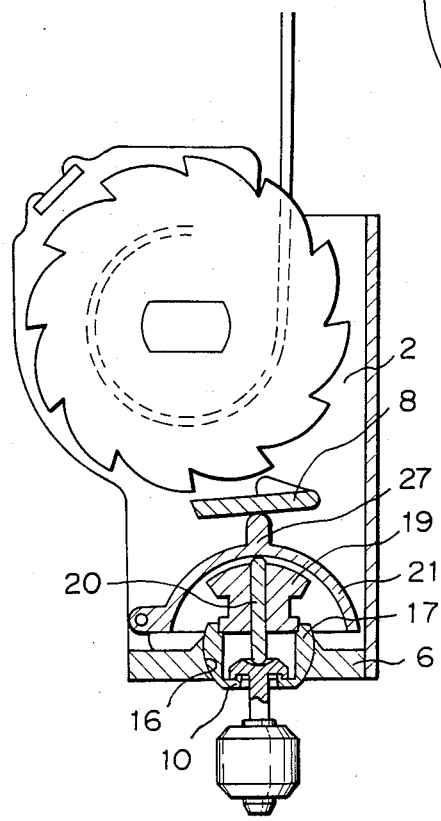

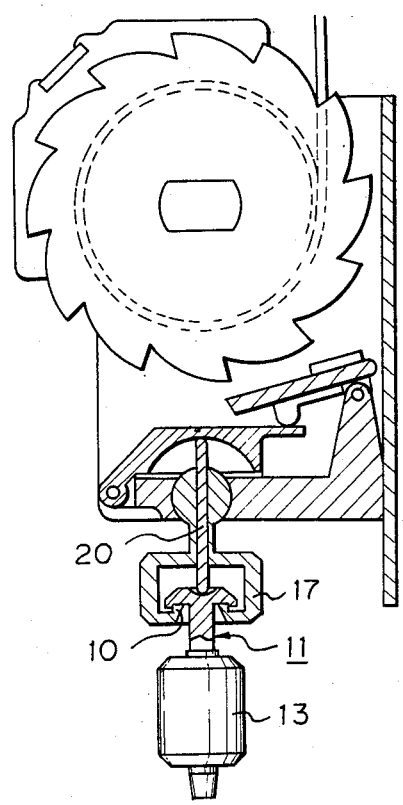
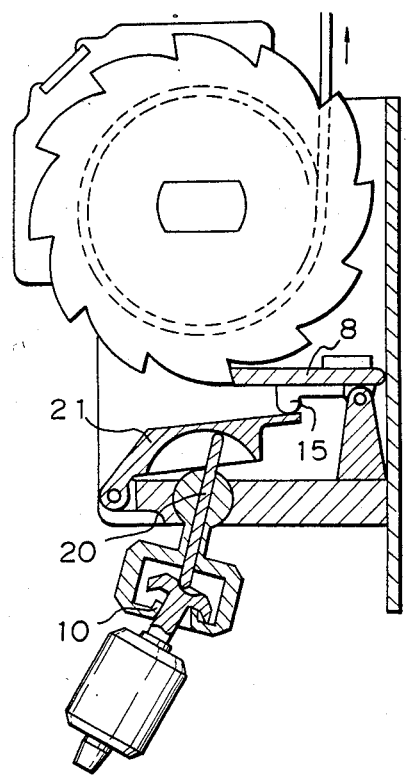

LOCK-TYPE SEAT BELT RETRACTOR OF AUTOMOBILE

BACKGROUND OF THE INVENTION

1. Field of the Invention

This invention relates to a seat belt retractor of an automobile, more particularly to a seat belt retractor with a device which locks the retractor to prevent unwinding of the belt therefrom.

2. Description of the Prior Art

A previously known lock-type seat belt retractor comprises a ratchet mechanism and a pendulum member which engages with a pawl of the ratchet mechanism and swings in response to shock, "shock" being defined herein as acceleration or deceleration of the automobile exceeding a predetermined value. The pawl is normally kept disengaged from a ratchet wheel, but engages with the ratchet wheel when the pendulum member swings and pushes it up in response to shock.

The above known retractor, however, must be mounted so that a bracket which supports the pendulum member is always in a horizontal position. If the bracket is in an inclined position, the pendulum member would be at a slant relative to the bracket and would push up the pawl to work the rachet mechanism. This necessitates mounting the seat belt retractor in a manner and on a portion of the automobile ensuring a continually fixed angle relative to the automobile body.

U.S. Pat. No. 4,331,304 issued on May 25, 1982, to N. Matsuoka et al. discloses a seat belt retractor which can operate even when inclined. The retractor is provided with a member which supports the pendulum member in a manner such that if the retractor is at a slant with respect to the automobile body, the support member swings to stably maintain the pendulum member at a constant angular position with respect to the automobile body.

In this device, however, the rod for transmitting to the pawl the relative movement of the pendulum member to the support member must be situated directly under the pawl. This also restricts the mounting position of the retractor.

SUMMARY OF THE INVENTION

An object of this invention is to provide a lock-type seat belt retractor in which there are no restrictions on the mounting positions thereof.

Another object of this invention is to provide a lock-type seat belt retractor which locks reliably regardless of the angle to the automobile body.

According to the present invention, there is provided a lock-type seat belt retractor comprising a housing for mounting on an automobile, a ratchet mechanism, a means for sensing shock, and a means for transmitting to the ratchet mechanism the movement of an inertia member provided to the sensing means.

The ratchet mechanism includes a reel rotatably supported in the housing and urged in a direction to retract and wind the seat belt. The ratchet mechanism also includes a ratchet wheel fixedly secured to the reel and a pawl supported in the housing and normally kept disengaged from the ratchet wheel.

The sensing means has an inertia member which moves relative to the housing in response to shock.

The transmitting means has a support member mounted in the housing so that, in operation, the support member does not displace as much as the inertia member in the same direction. The transmitting means also has a lever pivotably mounted in the housing and a rod supported by the support member so as to be movable along the axis thereof. The rod rests on the inertia member so as to move in response to movement of the inertia member. The top end of the rod is in contact with the lever so that, when the inertia member moves in response to shock, displacement of the rod is transmitted to the lever, whereby the lever pushes up the pawl so as to engage with a tooth of the ratchet wheel.

BRIEF DESCRIPTION OF THE DRAWINGS

In the drawings;

FIG. 1 is a sectional view of a first embodiment of the present invention, with the seat belt retractor in a vertical position;

FIG. 2 is a view similar to FIG. 1, but illustrating a state of shock;

FIG. 3 is a view similar to FIG. 1 with the seat belt retractor in an inclined position;

FIG. 4 is a view similar to FIG. 3, but illustrating a state of shock;

FIG. 5 is a sectional view of a second embodiment of the present invention;

FIG. 6 is a view similar to FIG. 5, but illustrating a state of shock;

FIG. 7 is a sectional view of a third embodiment;

FIG. 8 is a view similar to FIG. 7, but illustrating a state of shock;

DESCRIPTION OF THE PREFERRED EMBODIMENTS

Figure 9:
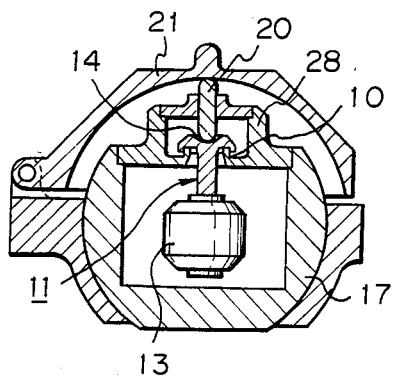
FIG. 9 is a sectional view of part of a fourth embodiment.

In FIGS. 1 to 4, there is shown a lock-type seat belt retractor according to a first embodiment of the present invention. A reel 1 is rotatably supported in a housing 2 mounted to an automobile body. An end of a seat belt 4 is fixed to the reel 1 by a pin 3, the seat belt 4 being wound about the reel 1. The reel 1 is continuously urged by a spring (not shown) in a direction to retract and wind the seat belt 4. A ratchet wheel 5 is fixedly secured to the reel 1. A pawl 8 is supported by a holder 7, which is pivotably supported by a pin 24 in the housing 2, and can engage with a tooth of the ratchet wheel 5. The pawl 8 is normally kept disengaged from the ratchet wheel 5. When shock is applied to the automobile body, however, the pawl 8 engages with the tooth of the ratchet wheel 5 so that the seat belt 4 is prevented from unwinding from the reel 1.

At the lower end of the housing 2, a bracket 6 is fixed by a screw 25 and a washer 26. The bracket 6 has an opening 16, in which a support member 17 is rotatably supported. The outer surface 18 of the support member 17 is spherical. The inner surface of the opening 16 is curved to correspond to the outer surface 18 of the support member 17. Therefore, the support member 17 is rotatable and in slidable contact with the bracket 6.

The support member 17 is approximately tubular and has a support ring 10 formed at a lower end thereof. A pendulum 11 has a flange 12, which is supported by the support ring 10, and is provided with a weight member 13 at the lower end. Therefore, the pendulum 11 can swing with respect to the support member 17 in response to shock, the flange 12 being supported at one point of the support ring 10 when the pendulum 11 swings.

A weight member 19 is rigidly fitted in the support member 17 at the top portion. A rod 20 penetrates through a hole formed at the center of the weight member 19. The lower end of the rod 20 rests on a top recess 14 of the pendulum 11. The upper end of the rod 20 contacts a lever 21 which is pivotably mounted to the bracket 6 by a pin 22. The rod 20 is movable along the axis thereof with respect to the weight member 19. Therefore, when the pendulum 11 swings in response to shock, it pushes up the rod 20 by its top recess 14 to raise the lever 21.

The lever 21 has a bowl shape, the inner surface of which is concentric with the outer surface 18 of the support member 17. A projection 15 formed under the pawl 8 rests on the lever 21. Accordingly, the pawl 8 is not raised when both the support member 17 and the pendulum 11 are rotated with respect to the center of rotation C of the support member 17. To the contrary, the pawl 8 is raised by the lever 21 when the pendulum 11 swings relative to the support member 17 so that the rod 20 is pushed up.

The center of gravity of the assembly of the pendulum 11, the weight member 13, the support member 17, the weight member 19, and the rod 20 is lower than the center of rotation C of the support member 17. Accordingly, under normal conditions, the axis of the assembly is on a vertical line $A_0—A_0$, as shown on FIG. 1, this state being stable. The center of gravity of the upper subassembly of the support member 17, the weight member 19, and the rod 20 is higher than the center of rotation C, while the center of gravity of the lower subassembly of the pendulum 11 and the weight member 13 is lower than the center of rotation C.

Therefore, when the automobile receives shock toward the right of FIG. 2, the upper subassembly rotates counterclockwise so that its axis coincides with the line $A_1—A_1$, while the lower subassembly rotates clockwise so that its axis coincides with the line $A_2—A_2$. As a result, the pendulum 11 inclines relative to the support member 17, so that one end of the flange 12 rises from the support ring 10. The rod 20 therefore engages with a periphery of the top recess 14 and is raised relative to the weight member 19 so as to push up the lever 21. This lever 21 then pushes up the projection 15 of the pawl 8 to position the pawl 8 for engagement with a tooth of the ratchet wheel 5. When the person using the seat belt is thrust forward from a seat by the shock, the seat belt 4 unwinds slightly toward the arrow B in FIG. 2, thus rotating the ratchet wheel 5 and causing engagement of a tooth with the pawl 8, thereby locking the seat belt 4.

In FIGS. 3 and 4 are shown the seat belt retractor in an inclined condition, FIG. 3 illustrating a normal condition, FIG. 4 a shock condition. Since the center of gravity of the assembly composed of the pendulum 11, the weight member 13, the support member 17, the weight member 19, and the rod 20 is lower than the center of rotation C of the support member 17, the assembly angularly displaces relative to the bracket 6 about the center of rotation C, so that its axis is on the vertical line $A_0—A_0$ in the normal condition shown in FIG. 3. In this condition, the rod 20 does not ascend relative to the weight 19 since the pendulum 11 does not rotate relative to the support member 17. Also, since the inner surface of the lever 21 forms a part of a sphere which is centered on the center of rotation C, the lever 21 is not raised by the rod 20 and the pawl 8 is released from the teeth of the ratchet wheel 5. Consequently, the seat belt 4 can be unwound from the reel 1. If shocks occur, the pendulum 11 swings relative to the support member 17, so that the rod 20 is pushed up to raise the pawl 8 by the lever 21. As a result, the pawl 8 engages with a tooth of the ratchet wheel 5 to lock the unwinding of the seat belt 4. This action is similar to the case shown in FIG. 2.

As mentioned above, in this embodiment, the axis of the support member 17 is always on the vertical line under normal conditions. Shock is sensed by the fact that relative angular displacement occurs between the pendulum 11 and the support member 17. Therefore, the seat belt retractor of this embodiment does not lock due to its angle to the automobile body and only locks when the automobile receives some shock. Since the support member 17 swings in the opposite direction to the swing of the pendulum 11, the angular displacement is relatively large, so that the shock is reliably sensed. Further, since the assembly of the pendulum 11, the weight member 13, the support member 17, the weight member 19, and the rod 20 is symmetric with respect to the axis thereof, all shocks in all directions are sensed with the same accuracy. It is possible to change the magnitude of shock which activates the locking mechanism by changing the diameter of the flange 12.

In FIGS. 5 and 6 is shown a second embodiment of the present invention, FIG. 5 illustrating a normal condition, FIG. 6 a shock condition. Parts similar to those in FIGS. 1 to 4 are given the same reference numerals and only differences between the second embodiment and the embodiment shown in FIGS. 1 to 4 will be discussed. This will also be true for the other embodiments discussed hereinafter. The opening 16 of the bracket 6 is formed so as to have a large area which is in contact with an outer surface of the support member 17. The weight member 19 is so formed that the upper portion thereof is larger than other portion, so that the center of gravity of the weight member 19 is higher than in the first embodiment. The pawl 8 is rotatably supported by the housing 2. A projection 27 is formed on the lever 21 and contacts the pawl 8. In this embodiment, the center of gravity of the first subassembly is higher than in the first embodiment. Therefore, in a shock condition, the angle of incline in the counter-clockwise direction is relatively large, as shown in FIG. 6.

In FIGS. 7 and 8 is shown a third embodiment of the present invention, FIG. 7 illustrating a normal condition, FIG. 8 a shock condition. Though the center of gravity of the subassembly of the support member 17 and the rod 20 is situated under the center of rotation of the support member 17, the center of gravity of the pendulum 11 and the weight member 13 is even lower. Consequently, upon shock, relative angular displacement occurs between the pendulum 11 and the support member 17, raising rod 20 and pushing up the lever 21. A projection 15 formed under the pawl 8 thus engages with a free end of the lever 21.

In FIG. 9 is shown a part of a fourth embodiment. The construction of this embodiment is such that the pendulum 11 and the weight member 13 are housed in the support member 17. This support member 17 has a generally spherical shape with a rectangular recess and a flat bottom. A support portion 28 provided with the support ring 10 is fixed at the upper opening. The rod 20 is supported at the upper portion of the support portion 28 so as to rise and fall. The lower end of the rod 20 rests on the recess 14 of the pendulum 11, and the top end of the rod 20 is in contact with the lever 21. The operation of this embodiment is similar to that of the above embodiments.

Figure 10:
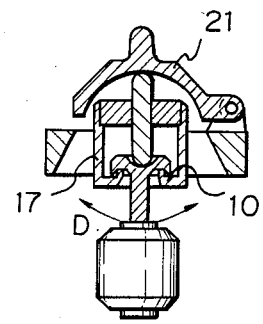
FIG. 10 is a sectional front view of part of a fifth embodiment.
Figure 11:
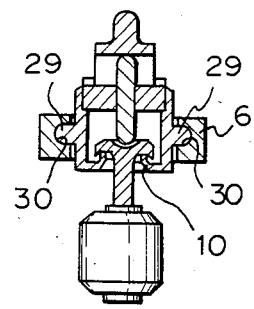
FIG. 11 is a sectional side view of part of the fifth embodiment.

In FIGS. 10 and 11 is shown a part of a fifth embodiment, FIG. 10 illustrating a front view, FIG. 11 a side view. The support member 17 is approximately cylindrical. At the sides thereof is formed a pair of pins 29, 29, which are inserted in pivot holes 30, 30 of the bracket 6. Therefore, the support member 17 is rotatable only along the arrow D shown in FIG. 10. That is to say, the support member 17 swings only along a vertical plane. The lever 21 has an arc-shape extending along the direction of rotation of the support member 17.

Figure 12:
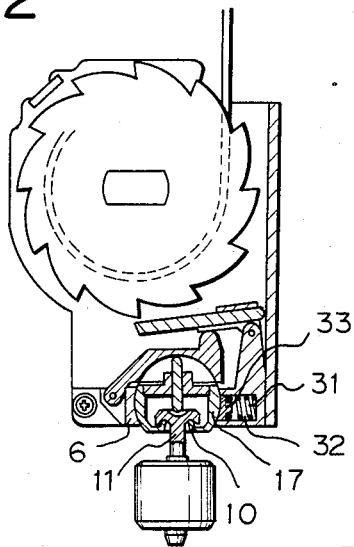
FIG. 12 is a sectional view of a sixth embodiment.
Figure 13:
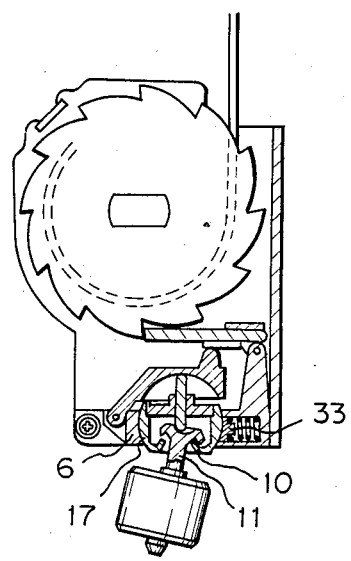
FIG. 13 is a view similar to FIG. 12, but illustrating a state of shock.
Figure 14:
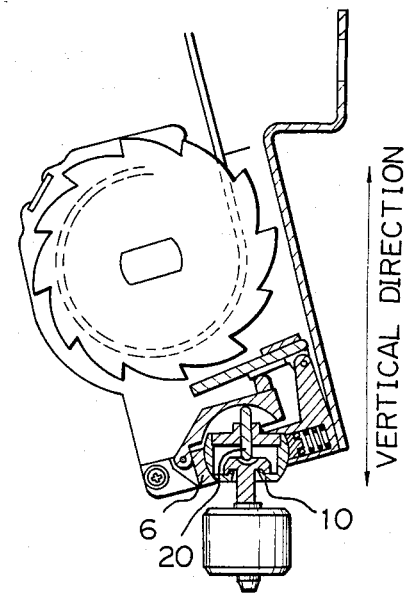
FIG. 14 is a view similar to FIG. 12, with the seat belt retractor in an inclined position.

In FIGS. 12 to 14 is shown a sixth embodiment, FIG. 12 illustrating a normal condition, in which the bracket 6 is horizontal, FIG. 13 a shock condition, FIG. 14 a normal condition in which the bracket 6 is inclined. In this embodiment, the bracket 6 forms a chamber 31 housing a pad 33 and a spring 32. The pad 33 is urged by the spring 32 so as to push an outer surface of the support member 17. Therefore, when the support member 17 swings, it is subjected to frictional resistance with the pad 33, thereby swings at a lower speed than the pendulum 11. Accordingly, relative angular displacement is caused between the support member 17 and the pendulum 11 when this seat belt retractor receives a shock. When the bracket 6 is inclined, the rod 20 and the pendulum 11 swing relative to the bracket 6, so that the axis of the rod 20 and the pendulum 11 coincides with a vertical line.

Figure 15:
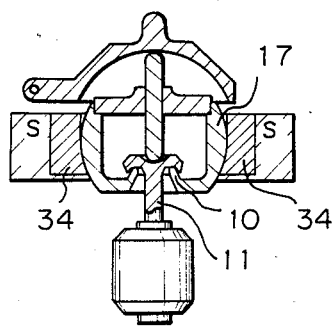
FIG. 15 is a sectional view of part of a seventh embodiment.

In FIG. 15 is shown a part of a seventh embodiment. In this embodiment, the support member 17 is made of a non-magnetic conductive material. Also, magnets 34, 34 are provided at both sides of the support member 17. The support member 17 is given a damping effect due to eddy-current loss, so that, upon shock, the support member 17 rotates only very slightly. Consequently, the pendulum 11 swings relative to the support member 17 upon shock.

Figure 16:
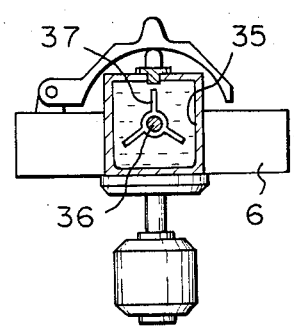
FIG. 16 is a sectional front view of part of an eighth embodiment.
Figure 17:
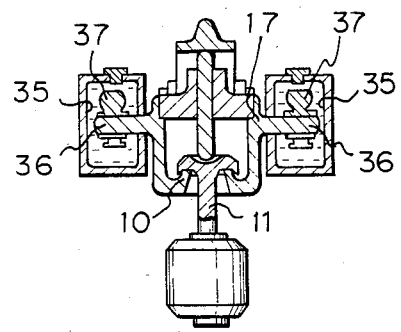
FIG. 17 is a sectional side view of part of the eighth embodiment.

In FIGS. 16 and 17 is shown a part of an eighth embodiment. The bracket 6 is provided with casings 35, 35 which are filled with liquid. A pair of pins 36, 36 is formed on the support member 17, the pins 36, 36 projecting in the casings 35, 35, respectively. Blades 37, 37 are respectively fixed at the pins 36, 36 in the casings 35, 35. Therefore, upon shock, the support member 17 encounters resistance from the liquid and rotates only slightly.

Figure 19:
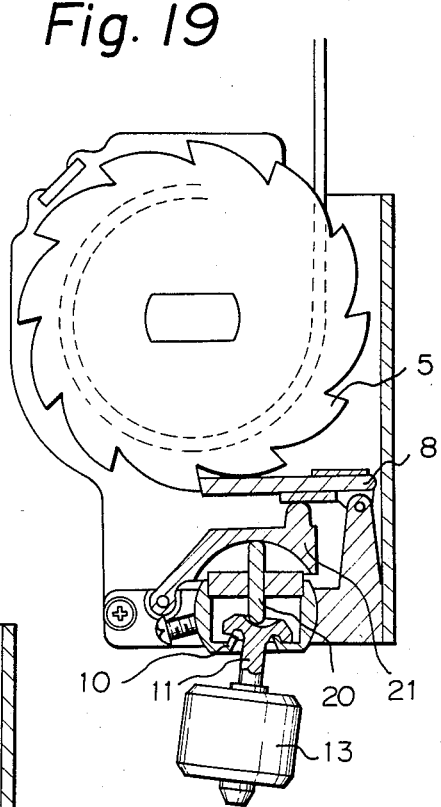
FIG. 19 is a view similar to FIG. 18, but illustrating a state of shock.
Figure 18:
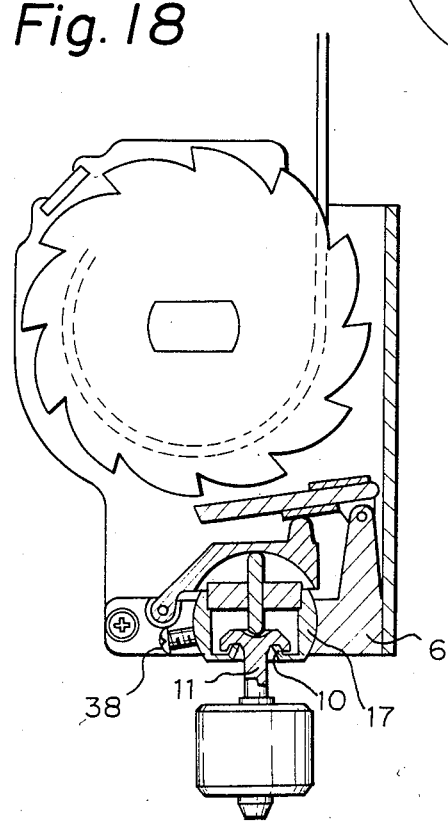
FIG. 18 is a sectional view of a ninth embodiment.
Figure 20:
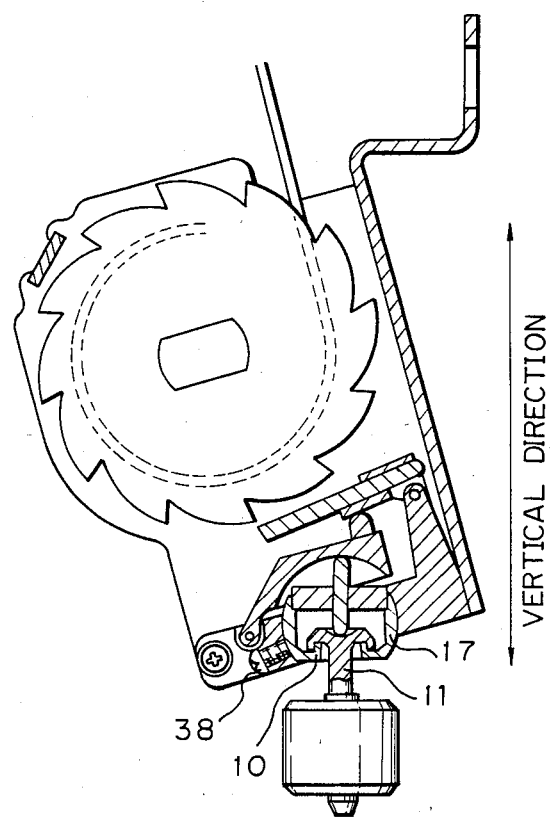
FIG. 20 is a view similar to FIG. 18, with the seat belt retractor in an inclined position.
Figure 21:
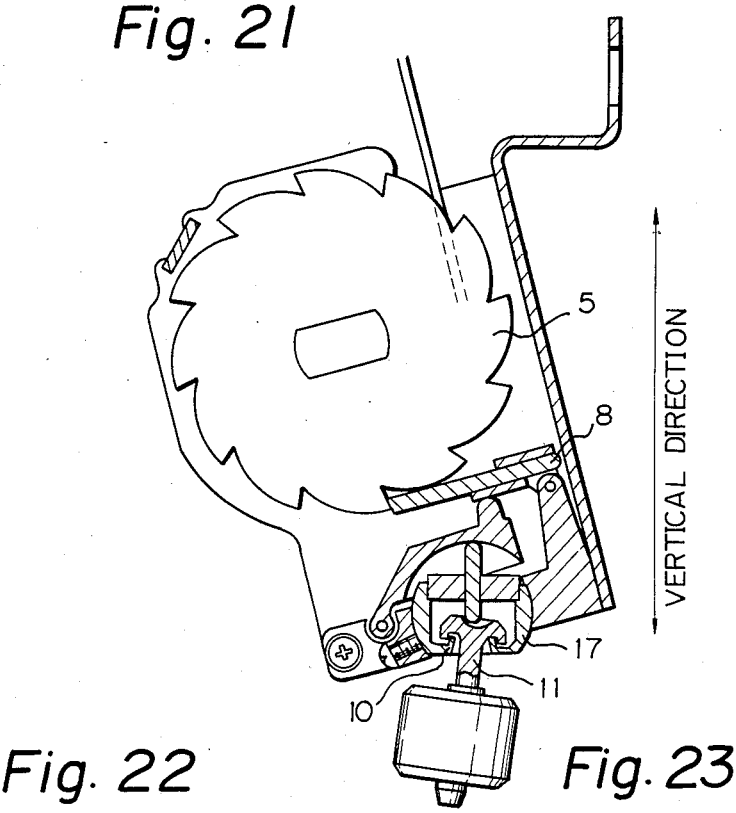
FIG. 21 is a view similar to FIG. 20, but illustrating a state of shock.

In FIGS. 18 to 21 is shown a ninth embodiment. In this embodiment, the retractor is mounted at a constantly fixed angle to the automobile body, which angle does not vary in use. The support member 17 is rigidly fixed to the bracket 6 by a screw 38 threadingly mounted to the bracket 6. In FIGS. 18 and 19 is shown a state in which the retractor is mounted with the bracket 6 horizontal. In this state, the pendulum 11 and the weight member 13 swing, raising the rod 20 and pushing up the lever 21. Thus, the lever 21 lifts the pawl 8, which engages with a tooth of the ratchet wheel 5. In FIGS. 20 and 21 is shown a condition in which the retractor is mounted with the bracket inclined. In this case, the screw 38 is loosened when mounting the retractor to the automobile body and is retightened when the retractor is mounted. That is to say, the rod 20, the pendulum 11, the support member 17, and so on are set up such that the axes thereof coincide with a vertical line. Thus, similar to the case of FIG. 19, the pendulum 11 rotates relative to the support member 17 upon shock and the pawl 8 engages with a tooth of the ratchet wheel 5.

Figure 22:
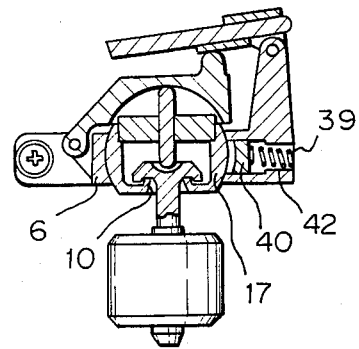
FIG. 22 is a sectional view of part of a tenth embodiment, illustrating a state in which a plug is not assembled.
Figure 23:
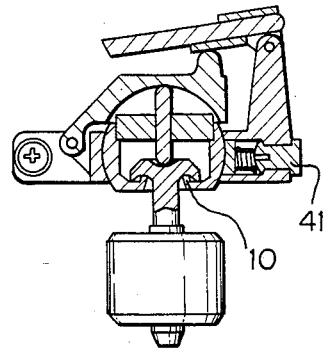
FIG. 23 is a view similar to FIG. 22, but illustrating a state in which the plug is assembled.

In FIGS. 22 and 23 is shown a part of a tenth embodiment. In this embodiment, a pad 40 and a spring 39 are used instead of the screw 38 of the ninth embodiment. When a plug 41 is not inserted in a chamber 42 in which the pad 40 and the spring 39 are provided, the pad 40 does not contact the support member 17, as shown in FIG. 22, and, therefore, the support member 17 is rotatable. To the contrary, when the plug 41 is inserted in the chamber 42, the support member 17 is urged by the spring 39 to fix the support member 17 to the bracket 6. The support member 17 can be rigidly fixed to the bracket 6, by selecting the force of the spring.

While embodiments of the present invention have been described with reference to the attached drawings, many modifications and changes may be made by those skilled in this art without departing from the scope of the invention.

We claim:

1. A lock-type seat belt retractor mounted on an automobile, comprising:

a housing for mounting on the automobile;

a ratchet mechanism including a reel rotatably supported in said housing and urged in a direction to retract and wind a seat belt, a ratchet wheel fixedly secured to said reel, a pawl supported in said housing and normally kept disengaged from said ratchet wheel;

a means for sensing shock, said sensing means having an inertia member which moves relative to said housing in response to the shock;

a means for transmitting the movement of said inertia member to said pawl; said transmitting means having a support member mounted in said housing so that, in operation, the support member does not displace as much as said inertia member in the same direction, a lever pivotably mounted in said housing, a rod supported by said support member so as to be movable along the axis thereof, said rod resting on said inertia member so as to move in response to the movement of said inertia member, the top end of said rod being in contact with said lever, so that, when said inertia member moves in response to the shock, displacement of said rod is transmitted to said lever, whereby said lever pushes up said pawl so as to engage with a tooth of said ratchet wheel;

said support member having a spherical outer surface which is in slidable contact with said housing, so that said support member is rotatable relative to said housing; and said lever has a spherical inner surface which is concentric with said outer surface of said support member.

2. A lock-type seat belt retractor according to claim 1, wherein said housing contacts a large part of said outer surface of said support member.

3. A lock-type seat belt retractor according to claim 1, further comprising a pad urged to said outer surface of said support member, so that frictional resistance acts on said support member when said support member rotates.

4. A lock-type seat belt retractor according to claim 1, further comprising a magnet provided in a portion adjacent to said support member, which is made of a non-magnetic conductive material.

5. A lock-type seat belt retractor according to claim 1, wherein said support member is fixed to said housing by a screw which is threadingly mounted to said housing.

6. A lock-type seat belt retractor according to claim 1, wherein said support member is rotatable in a vertical plane.

7. A lock-type seat belt retractor according to claim 6, further comprising casings which hold liquid and a pair of pins formed on said support member, said pins projecting in said casings and provided with blades.

8. A lock-type seat belt retractor according to claim 1, wherein said inertia member is a pendulum having a weight member.

9. A lock-type seat belt retractor according to claim 1, wherein said inertia member is housed in said support member.

10. A lock-type seat belt retractor according to claim 1, wherein said support member is provided with a weight member.

11. A lock-type seat belt retractor according to claim 10, wherein the center of gravity of said support member is above the center of rotation of said support member.

12. A lock-type seat belt retractor according to claim 10, wherein the center of gravity of said support member is lower than the center of rotation of said support member.

13. A lock-type seat belt retractor according to claim 10, wherein said rod penetrates said weight member of said support member, said rod being movable relative to said weight member.

14. A lock-type seat belt retractor according to claim 1, wherein said pawl engages with a free end of the lever.

* * * * *